United States Patent
Petrovic et al.

(10) Patent No.: US 9,038,376 B2
(45) Date of Patent: May 26, 2015

(54) METHOD FOR EXHAUST-GAS AFTERTREATMENT WITH REDUCED EMISSIONS

(75) Inventors: Simon Petrovic, Aachen (DE); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 13/565,402

(22) Filed: Aug. 2, 2012

(65) Prior Publication Data
US 2013/0047607 A1 Feb. 28, 2013

(30) Foreign Application Priority Data
Aug. 26, 2011 (DE) .......................... 10 2011 081 644

(51) Int. Cl.
*F01N 3/10* (2006.01)
*F02M 25/07* (2006.01)
*F02D 21/08* (2006.01)

(52) U.S. Cl.
CPC ....... *F02M 25/0718* (2013.01); *F02M 25/0707* (2013.01); *F02M 25/0709* (2013.01); *F02D 21/08* (2013.01); *Y02T 10/121* (2013.01)

(58) Field of Classification Search
CPC ............... F02D 21/08; F02M 25/0718; F02M 25/0707; F02M 25/0709; Y02T 10/121

USPC ........................................... 60/272–324, 374
See application file for complete search history.

(56) References Cited

U.S. PATENT DOCUMENTS

| | | |
|---|---|---|
| 2007/0251216 A1* | 11/2007 | Easley et al. .................... 60/285 |
| 2008/0000219 A1* | 1/2008 | Ratcliff et al. .................. 60/274 |
| 2010/0101409 A1* | 4/2010 | Bromberg et al. .................. 95/8 |
| 2010/0139267 A1* | 6/2010 | Schliesche et al. ............. 60/602 |
| 2012/0173062 A1* | 7/2012 | Madurai Kumar et al. ..... 701/22 |

FOREIGN PATENT DOCUMENTS

| | | |
|---|---|---|
| DE | 10203309 A1 | 7/2003 |
| DE | 102010005428 A1 | 7/2011 |

* cited by examiner

*Primary Examiner* — Audrey K Bradley
*Assistant Examiner* — Kelsey Stanek
(74) *Attorney, Agent, or Firm* — Julia Voutyras; Alleman Hall McCoy Russell & Tuttle LLP

(57) ABSTRACT

An exhaust-gas recirculation device for an internal combustion engine, a method for controlling an exhaust-gas recirculation device, a drive for a motor vehicle having an exhaust-gas recirculation device, and a motor vehicle having a drive of said type are described. The exhaust-gas recirculation device comprises a turbine, and an exhaust-gas aftertreatment device. The exhaust-gas aftertreatment device has an inlet connected to an outlet of the turbine, and is configured to reduce a pollutant content in the exhaust-gas flow. An electric grid heater is arranged between the outlet of the turbine and the inlet of the exhaust-gas aftertreatment device and is configured to heat the exhaust-gas flow.

13 Claims, 7 Drawing Sheets

Prior Art

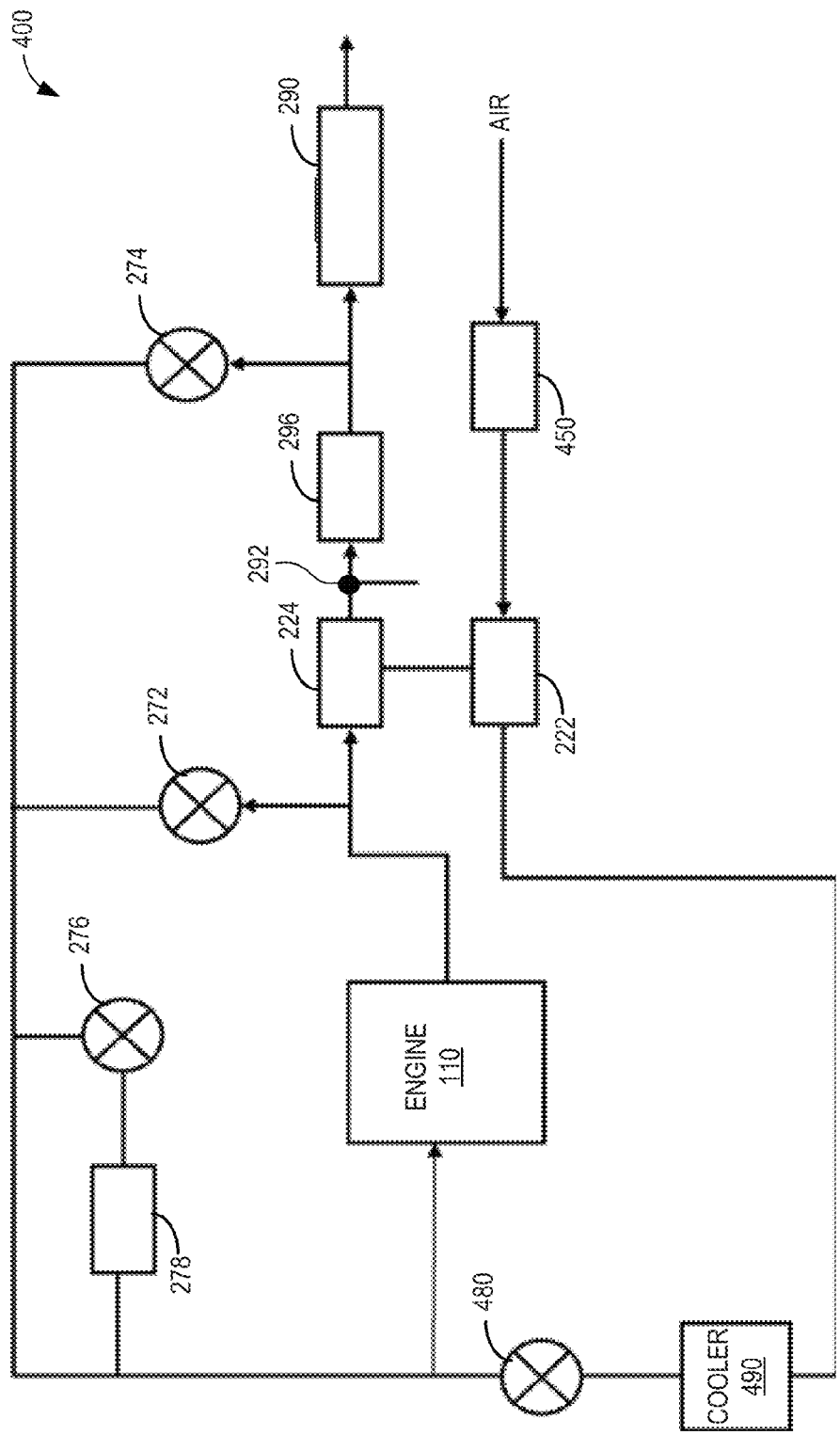

METHOD FOR EXHAUST-GAS AFTERTREATMENT WITH REDUCED EMISSIONS

RELATED APPLICATIONS

The present application claims priority to German Patent Application No. 102011081644.5, filed on Aug. 26, 2011, the entire contents of which are hereby incorporated by reference for all purposes.

FIELD

The present description relates to improving vehicle emissions. In one example, an electric grid heater is used to rapidly heat exhaust-gas flowing into the aftertreatment system after cold starts to catalyst light-off temperatures. The approach may be particularly useful to reduce NOx emissions after engine starting.

BACKGROUND/SUMMARY

Contemporary vehicle engines are equipped with exhaust-gas aftertreatment devices, which serve to convert harmful exhaust-gas pollutants (e.g., NOx, CO, hydrocarbons, and the like) to inert or environmentally benign gases such as water vapor and nitrogen, thereby preventing their release into the environment. Some examples of such exhaust-gas aftertreatment devices include diesel particulate filters (DPF), diesel oxidation catalyst (DOC), lean NOx traps (LNT), and selective catalyst reduction devices (SCR). However, exhaust-gas aftertreatment devices exhibit high conversion efficiency within a relatively narrow temperature window, the temperature window being dependent, for example, on the metal substrate or type of catalyst used. When pollutant-containing exhaust-gases flow through exhaust-gas aftertreatment devices whose operating temperature is outside of the optimal temperature window, conversion efficiency is low and environmentally harmful pollutants are emitted from the vehicle. For example, DOC temperatures can be below light-off temperatures for oxidizing pollutants such as exhaust hydrocarbons during a period following cold engine starts. For this reason, post-injection of fuel is often used to heat up the exhaust-gas when the exhaust-gas temperature is low. An alternate approach incorporates a pre-turbine catalyst (PTC) to increase the cold conversion of hydrocarbons and carbon monoxide. Electric catalytic converters have also been proposed, wherein heating elements are arranged directly on or upstream of the exhaust aftertreatment devices.

The inventor herein has recognized potential issues with the above approaches. While post-injection can aid in raising exhaust-gas temperatures, post-injection of fuel is detrimental to overall fuel economy. Furthermore, combustion of fuel at low exhaust-gas temperatures leads to increased generation and deposition of soot or particulate matter, exacerbating fouling of exhaust aftertreatment devices. Furthermore, poor durability of pre-turbine catalysts has stunted their widespread introduction, and electric catalytic converters are too expensive and require too much power to be practical.

One approach that addresses the aforementioned issues is a method for reducing exhaust emissions from an internal combustion engine comprising powering a grid heater using an energy storage device to raise the exhaust-gas temperature during a first exhaust-gas condition, injecting fuel to raise the exhaust-gas temperature during a second exhaust-gas condition, and maintaining the exhaust-gas temperature by outputting power to the grid heater, injecting fuel, recycling the exhaust-gas, and cooling the recycled exhaust-gas with a cooler during a third exhaust-gas condition. Because the grid heater is used to heat the exhaust-gas entering the exhaust-gas aftertreatment device, the power requirements for the grid heater are much lower than those for electric catalytic converters, and as such, the grid heater can be installed without extensive modifications to existing energy supply sources. Another advantage is that the power supplied to the electrical grid heater may be generated by selective regenerative charging (SRC) technologies such as regenerative braking, thereby conserving fuel economy relative to conventional emissions discharge reduction methods. Furthermore, using a grid heater to heat the exhaust-gas flow during cold starts can prolong the life of exhaust-gas aftertreatment devices relative to post-injection methods because fuel injected when the exhaust-gas is cold results in higher soot deposition and fouling at the exhaust-gas aftertreatment device.

The above advantages as well as other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows a simplified process schematic of engine, comprising a turbocharger, grid heater, exhaust-gas aftertreatment device, exhaust-gas recycle valves and cooler, and intake air cooler.

DETAILED DESCRIPTION

Figure 1:
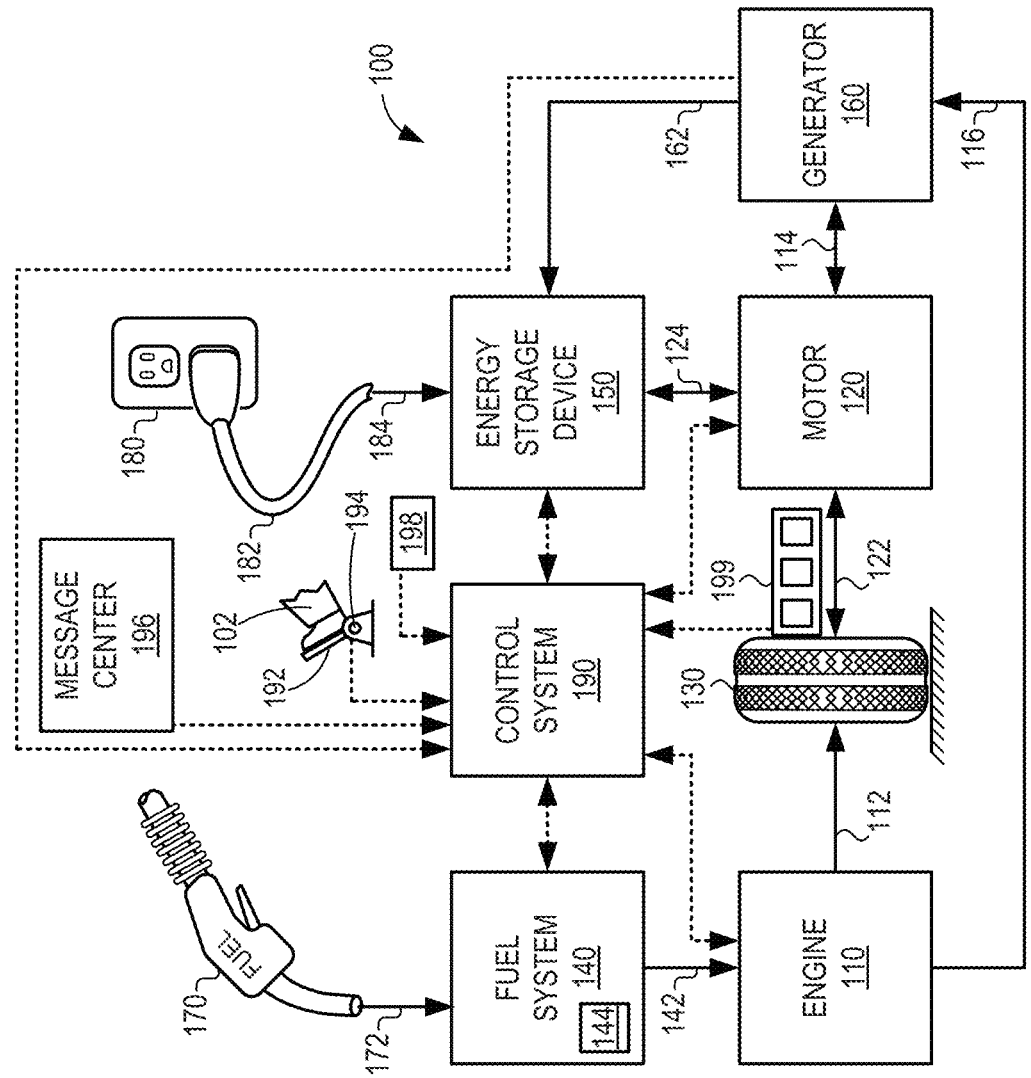
FIG. 1 shows a schematic of a propulsion system for a vehicle, including an engine, energy storage device, fuel system, and motor.
Figure 2:
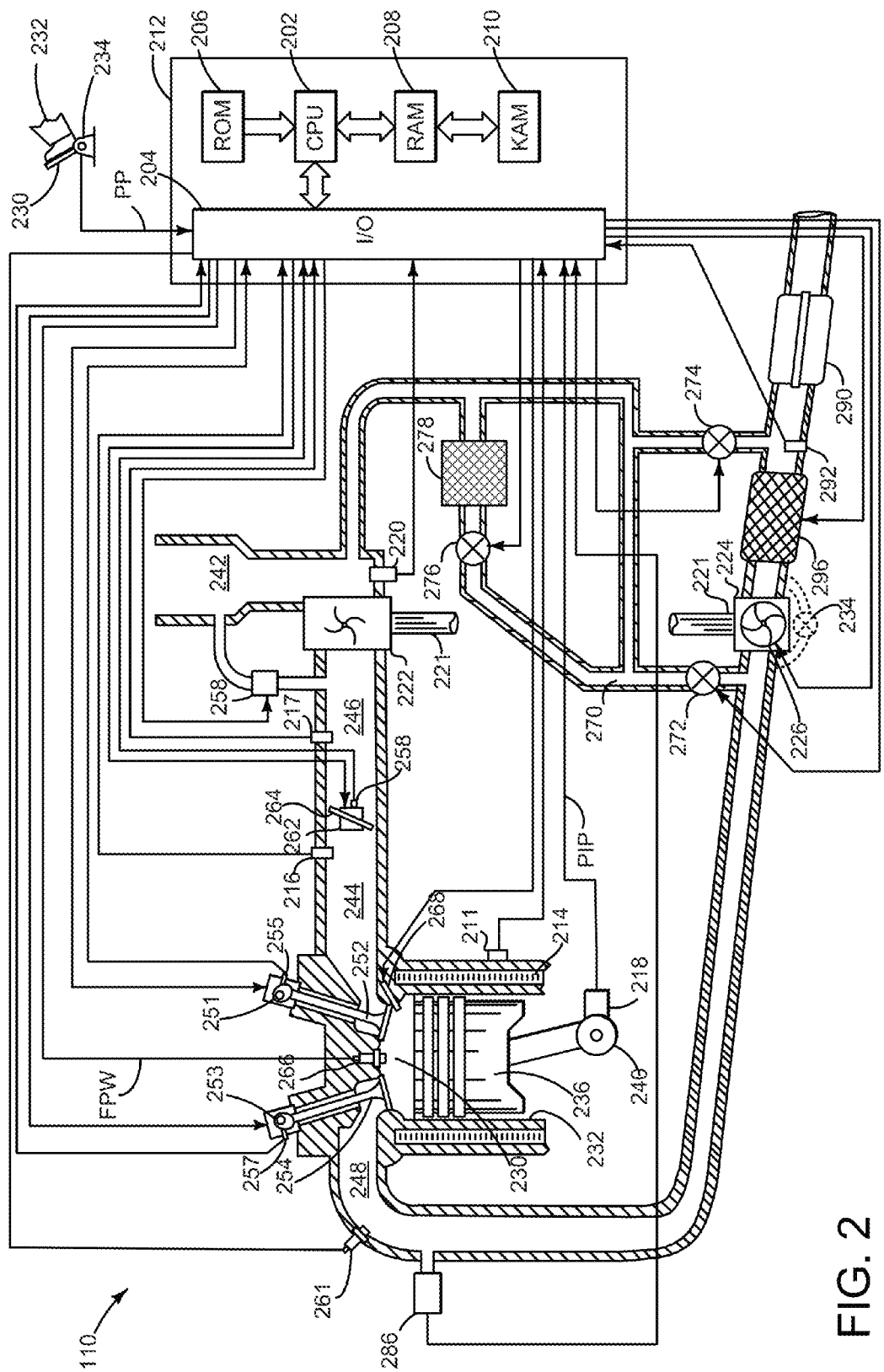
FIG. 2 shows a schematic of an engine, including a grid heater, exhaust-gas aftertreatment device, and exhaust-gas recycle.
Figure 3A:
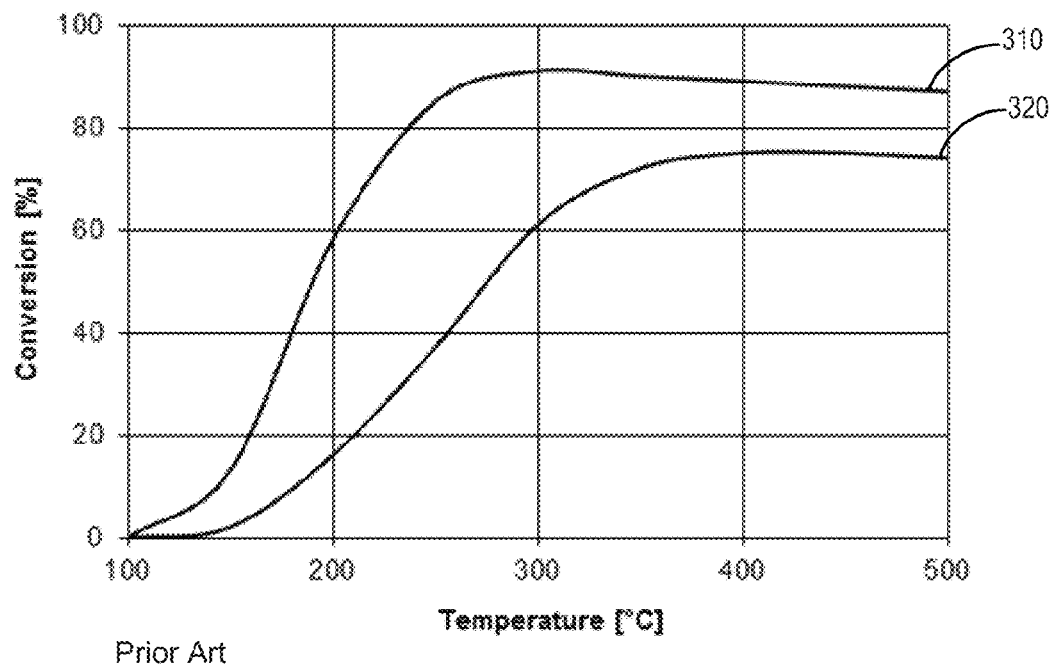
FIG. 3A shows a plot of the conversion efficiency of a typical diesel oxidation catalytic converter (DOC) as a function of its temperature.
Figure 3B:
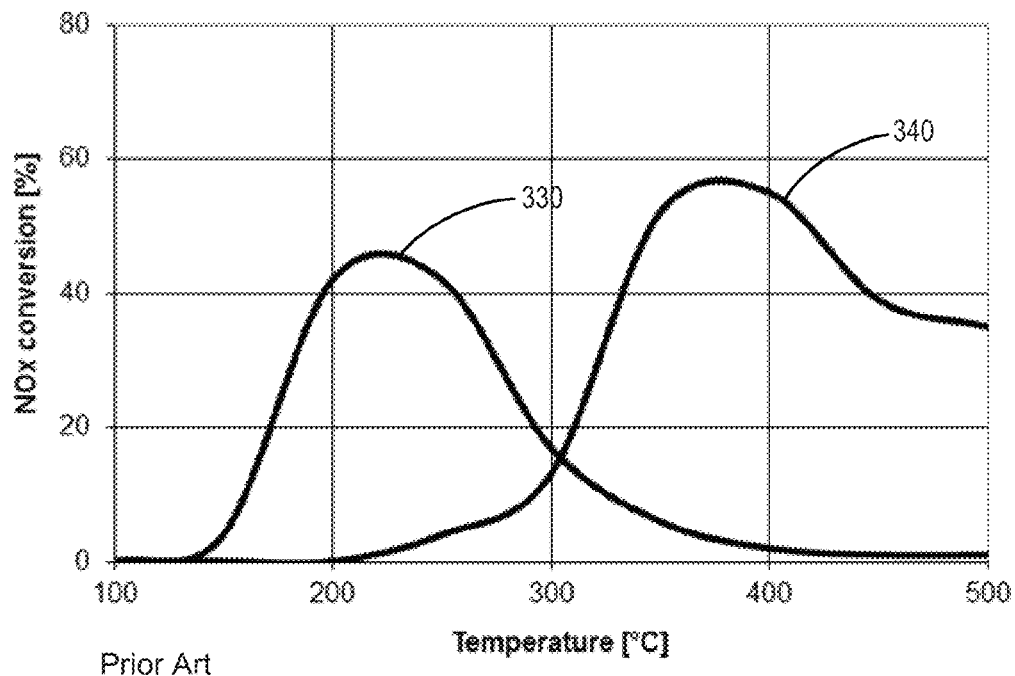
FIG. 3B shows a plot of the conversion efficiency of two NOx reduction catalysts as a function of their temperature.
Figure 5:
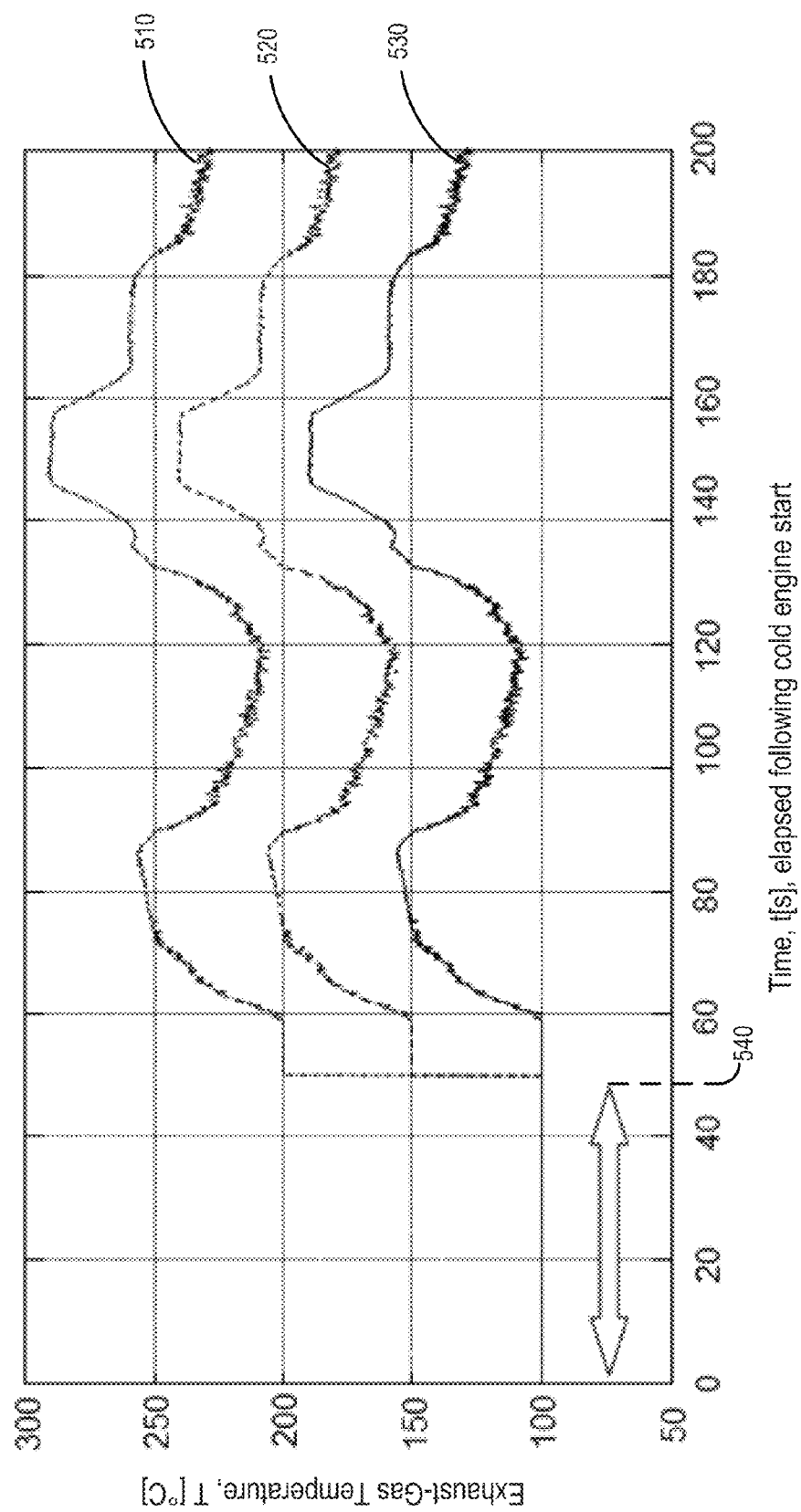
FIG. 5 shows a plot of exemplary temperature profiles of an exhaust-gas flow.
Figure 6:
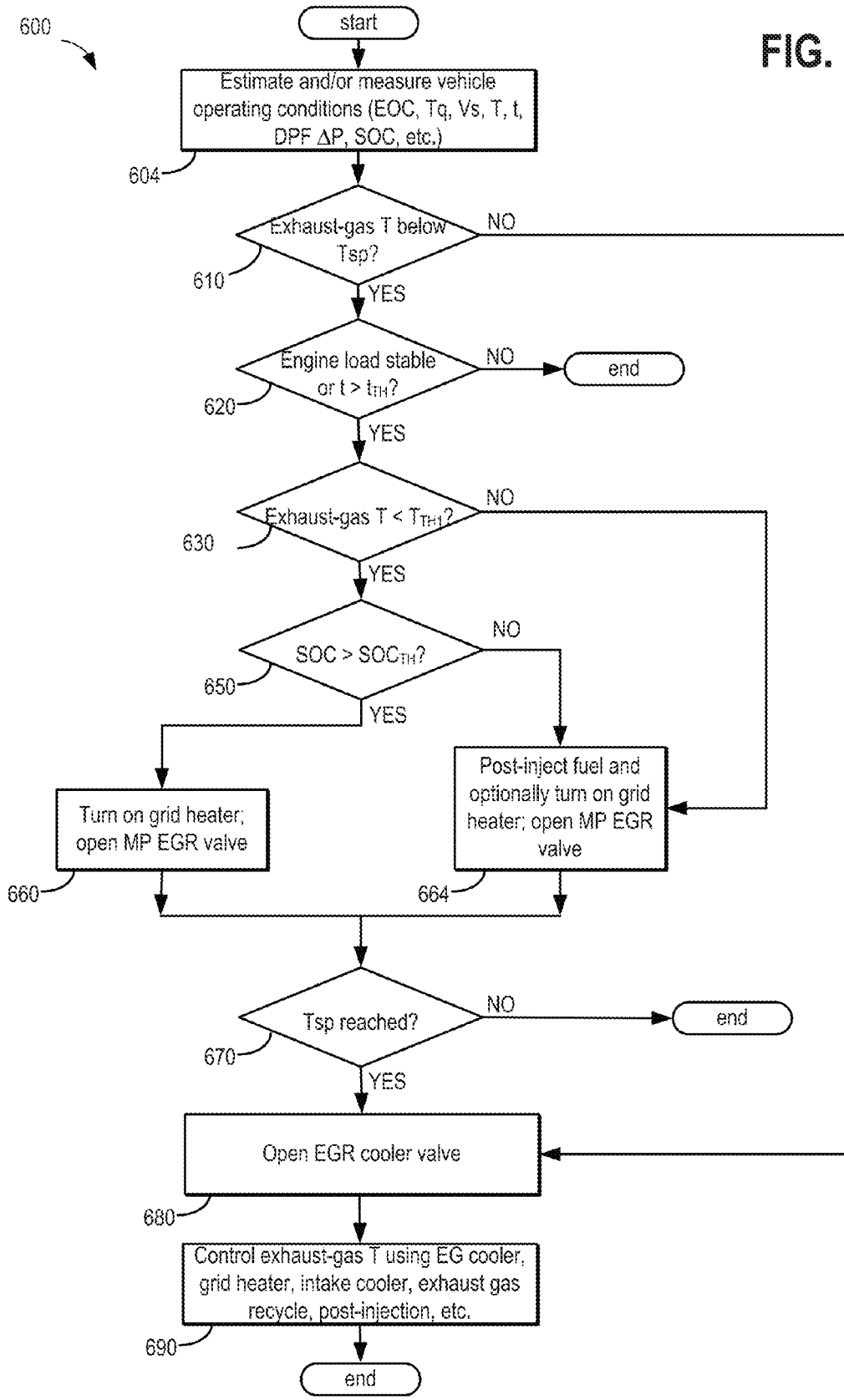
FIG. 6 is a flow chart of an example method for reducing emissions from an engine.
Figure 7:
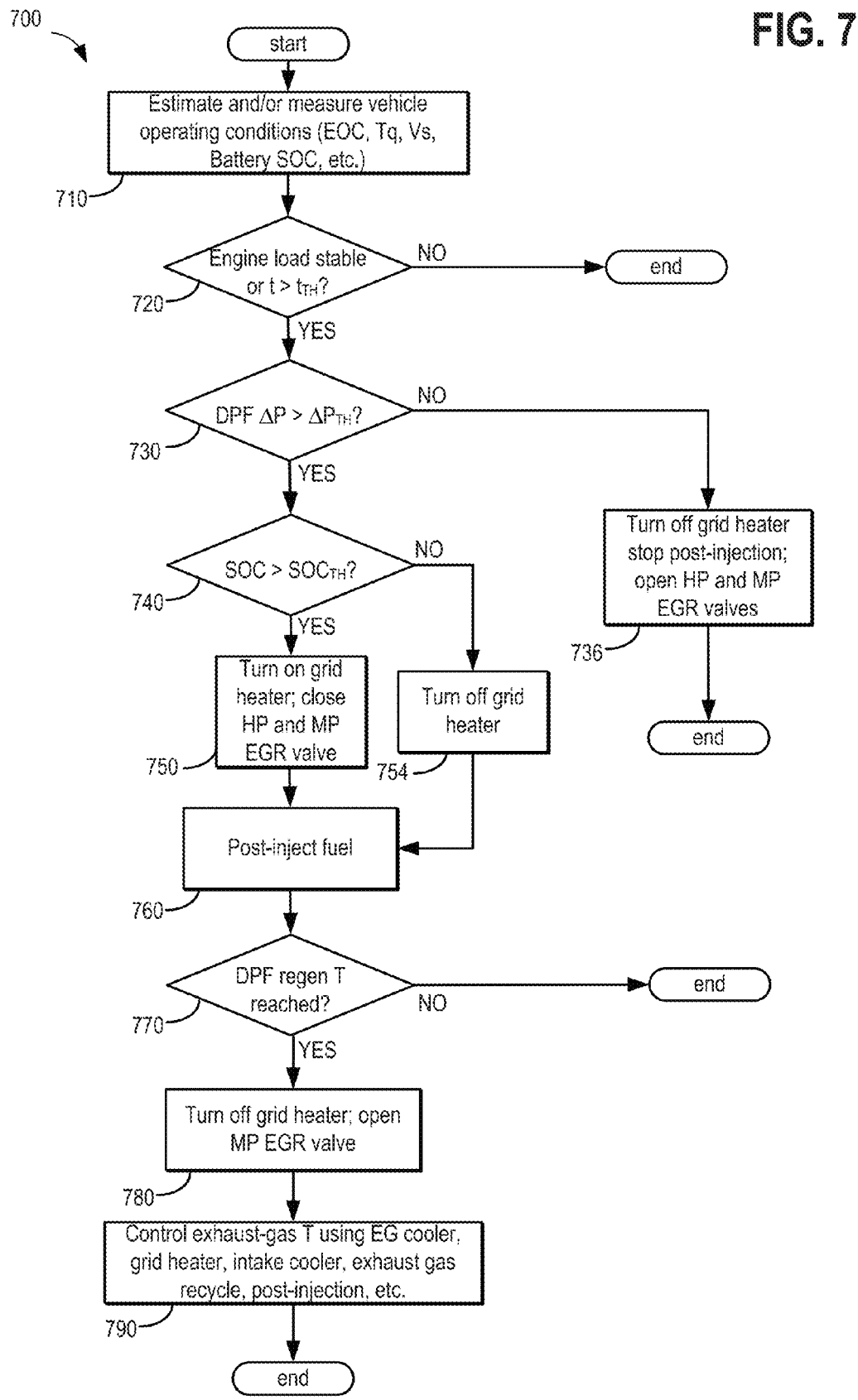
FIG. 7 is a flow chart of an example method for reducing emissions from an engine.

The present description is related to controlling engine emissions of a vehicle. In particular, engine emissions may be reduced via the systems and method described herein. FIG. 1 illustrates an example of a propulsion system for a vehicle comprising an engine, motor, generator, fuel system and control system. FIG. 2 illustrates an example of an internal combustion engine, although the systems and method disclosed can be applicable to compression ignition engines and turbines. The example engine shown in FIG. 2 comprises an exhaust-gas system including an exhaust-gas aftertreatment device, a grid heater, and exhaust-gas recycle lines. FIGS. 3A and 3B show plots of typical conversion-temperature data curves exhibited by oxidation catalysts and NOx reduction catalysts used in engine emission control devices. FIG. 4 illustrates an example process schematic of an engine, including intake and exhaust lines, as well as exhaust-gas recycle. FIG. 5 depicts a chart showing plots of example exhaust-gas temperature profiles with time for three cases where a grid heater is used to heat the exhaust-gas. FIGS. 6 and 7 are flowcharts that illustrate example methods employing a grid heater, post-injection of fuel, and exhaust-gas recycling to control exhaust-gas temperatures for reducing engine emissions.

FIG. 1 illustrates an example a vehicle propulsion system 100. Vehicle propulsion system 100 may comprise a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on vehicle operating conditions.

Fuel system 140 may include one or more fuel storage tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, an exhaust-gas grid heater, an exhaust-gas recycle cooler, etc. As a non-limiting example, energy storage device 150 may include one or more batteries and/or capacitors.

Control system 190 may communicate with one or more of engine 110, motor 120, fuel system 140, energy storage device 150, and generator 160. As will be described by of FIG. 2, control system 190 may comprise controller 212 and may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

This plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Referring now to FIG. 2, it illustrates an internal combustion engine 110 comprising a plurality of cylinders, one cylinder of which is shown in FIG. 2, and is controlled by control system 190, the control system 190 comprising electronic engine controller 212. Engine 110 includes combustion chamber 230 and cylinder walls 232 with piston 236 positioned therein and connected to crankshaft 240. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. The position of intake cam 251 may be determined by intake cam sensor 255. The position of exhaust cam 253 may be determined by exhaust cam sensor 257.

Fuel injector 266 is shown positioned to inject fuel directly into combustion chamber 230, which is known to those skilled in the art as direct injection. Fuel injector 266 delivers fuel in proportion to the pulse width of signal FPW from controller 212. Fuel is delivered to fuel injector 266 by a fuel system 140 as shown in FIG. 1. Fuel pressure delivered by the fuel system may be adjusted by varying an inlet metering valve regulating flow to a fuel pump (not shown) and a fuel rail pressure control valve. A second fuel injector 261 is shown positioned to inject fuel downstream from the combustion chamber 230 into the exhaust manifold 248, which is known to those skilled in the art as post injection. Fuel injector 261 can deliver fuel in proportion to the signal from controller 212. Fuel is delivered to fuel injector 261 by a fuel system 140 as shown in FIG. 1. Fuel pressure delivered by the fuel system may be adjusted by varying an inlet metering valve regulating flow to a fuel pump (not shown) and a fuel rail pressure control valve.

Intake manifold 244 is shown communicating with optional electronic throttle valve 262 which adjusts a position of throttle plate 264 to control air flow from intake boost chamber 246. Compressor 222 draws air from air intake 242 to supply boost chamber 246. Exhaust-gases spin turbine 224 which is coupled to compressor 222 via shaft 221. In some examples, a charge or intake air cooler may also be provided. Compressor speed may be adjusted via adjusting a position of variable vane control 226 or compressor bypass valve 228. In alternative examples, a waste gate 234 may replace or be used in addition to variable vane control 226. Variable vane control 226 adjusts a position of variable geometry turbine vanes. Exhaust-gases can pass through turbine 224 supplying little energy to rotate turbine 224 when vanes are in an open position. Exhaust-gases can pass through turbine 224 and impart increased force on turbine 224 when vanes are in a closed position. Alternatively, waste gate 234 allows exhaust-gases to flow around turbine 224 so as to reduce the amount of energy supplied to the turbine. Furthermore, turbine 224 may be a turbine with fixed geometry. Compressor bypass valve 228 allows compressed air at the outlet of compressor 222 to be returned to the input of compressor 222. In this way, the efficiency of compressor 222 may be reduced so as to affect the flow of compressor 222 and reduce the possibility of compressor surge.

Combustion is initiated in combustion chamber 230 when fuel ignites without a dedicated spark source such as a spark plug as piston 236 approaches top-dead-center compression stroke and cylinder pressure increases. In some examples, a universal Exhaust-gas Oxygen (UEGO) sensor 286 may be coupled to exhaust manifold 248 upstream of exhaust-gas aftertreatment device 290. In other examples, the UEGO sensor 286 may be located downstream of one or more exhaust after treatment devices. Further, in some examples, the UEGO sensor 286 may be replaced by a NOx sensor that has both NOx and oxygen sensing elements.

At lower engine temperatures glow plug 268 may convert electrical energy into thermal energy so as to raise a temperature in combustion chamber 230. By raising temperature of combustion chamber 230, it may be easier to ignite a cylinder air-fuel mixture via compression.

Grid heater 296 can be located upstream from exhaust-gas aftertreatment device 290 in the exhaust manifold 248. Grid heater can be supplied power by energy storage device 150, and may be controlled via electronic engine controller 212.

Exhaust-gas aftertreatment device 290 can include a particulate filter and catalyst bricks, in one example. In another example, multiple exhaust-gas aftertreatment devices, each with multiple bricks, can be used. Exhaust-gas aftertreatment device 290 can include an oxidation catalyst in one example. In other examples, the exhaust-gas aftertreatment device may include a lean NOx trap, a hydrocarbon trap, a CO trap, a selective catalyst reduction (SCR) catalyst, and/or a diesel particulate filter (DPF).

Exhaust-gas is decompressed and cooled as it flows through turbine 224. As such, the exhaust-gas may slowly heat up downstream exhaust-gas aftertreatment device 290. In the case of a cold start, the conversion efficiency of the exhaust-gas aftertreatment device 290 will be low, for a period of time, until the exhaust-gas can warm the exhaust-gas aftertreatment device 290 appreciably, before which the discharged exhaust-gas may contain a high content of pollutants (e.g., CO, NOx, HC). Accordingly, controller 212 may supply power from energy storage device 150 to power grid heater 296 to raise the temperature of the exhaust-gas. Grid heater 296 can thereby be used to heat the exhaust-gas aftertreatment device 290 by heating the exhaust-gas flow entering exhaust-gas aftertreatment device 290. Because the grid heater 296 heats the exhaust-gas directly, the grid heater 296 can be operated with relatively low heating power, which can avoid placing an excessive load on the energy storage device 150.

Accordingly, grid heater 296 can be a commonly known heater such as an intake air heater used for heating the intake air of an internal combustion engine, and which, owing to their widespread use, is relatively inexpensive. Using such a grid heater 296, with relatively low amounts of heating power, the temperature of the exhaust-gas flow can be quickly raised.

A considerable portion of the pollutants discharged from a motor vehicle are emitted during the time period following motor vehicle cold starts (e.g., before the exhaust-gas and therefore the exhaust-gas aftertreatment device 290 have been adequately heated). Thus, heating the exhaust-gas flow immediately following cold starts can considerably reduce harmful vehicle emissions. For example, a low power grid heater 296 used to heat the exhaust-gas flow a short distance upstream of the exhaust-gas aftertreatment device 290 during cold starts can considerably reduce vehicle emissions of CO, HC, NOx, and the like.

The heating power requirements for a heater such as grid heater 296 are much smaller than heating power requirements for electric catalytic converter devices that have been considered elsewhere. For example, exhaust-gas model calculations have shown that a significant reduction in exhaust-gas pollutant content can be effected if the exhaust-gas flow is heated, raising the exhaust-gas temperature by approximately 50° C. For example, a device such as grid heater 296 positioned upstream of exhaust-gas aftertreatment device 290 can raise the exhaust-gas temperature by 50° C. with a heating power of approximately 800 W. As a further example, a grid heater 296 with a heating power of approximately 1600 W can raise the exhaust-gas temperature by approximately 100° C. Furthermore, 2000 W can be made available for a grid heater 296, without extensive modifications to the electrical system or fuel injection system of a vehicle. As such, the grid heater 296 is preferably designed to output a heating power of less than 2000 watts, preferably less than 1000 watts.

A portion of the exhaust-gas may be recycled via exhaust recycle line 270 to air intake 242. In one example, a high-pressure (HP) exhaust-gas recycle valve 272 can be opened by controller 212 to divert a portion of the exhaust-gas upstream of exhaust turbine 224 and grid heater 296. Similarly, a mid-pressure (MP) exhaust-gas recycle valve 274 can be opened by controller 212 divert a portion of the exhaust-gas downstream of the grid heater upstream of the exhaust-gas aftertreatment device 290. The exhaust-gas pressure is lowered as it passes through turbine 224, the exhaust-gas transferring energy to rotate the vanes the turbine 224. As such, the exhaust-gas pressure downstream of turbine 224 may be lower (MP exhaust-gas) than that upstream of turbine 224 (HP exhaust-gas). In conventional designs, decompression of the exhaust-gas as it flows through turbine 224 can result in exhaust-gas condensation (e.g., condensation of water vapor). Condensed water vapor can be entrained with exhaust-gas recycle to the engine cylinders reducing engine efficiency, breaking down oil film seals, and increasing corrosion of engine parts. By using grid heater 296 to heat the exhaust-gas downstream from turbine 224, water vapor condensation and its associated problems, can be avoided.

Because the grid heater 296 heats the exhaust-gas flow, the exhaust-gas temperature downstream of turbine 224 may be higher than that upstream of turbine 224. Diverted exhaust-gas via valves 272 and/or 274 can flow directly to intake chamber 242. Alternately, a portion of the recycled exhaust-gas can be directed through an exhaust-gas recycle cooler 278 by the controller 212 by opening exhaust-gas cooler valve 276. Thus, by controlling valves 272 and 274, controller 212 can balance the flow versus recycle of exhaust-gas. Furthermore, by controlling grid heater 296, exhaust-gas cooler 278, and exhaust-gas cooler valve 276, controller 212 can regulate the temperature of the exhaust-gas recycle, and the temperature of the exhaust-gas reaching the exhaust-gas aftertreatment device 290.

Sensor 292 can be an exhaust-gas temperature sensor that communicates with controller 212. As shown in FIG. 2, sensor 292 is located downstream from grid heater 296, but upstream from exhaust-gas aftertreatment device 290. Sensor 292 can optionally be located at the exhaust-gas aftertreatment device 290, communicating the temperature of exhaust-gas aftertreatment device 290 to controller 212. In a further example, sensor 292 may also be located upstream of the grid heater 296 or upstream of turbine 224, or downstream from exhaust-gas aftertreatment device 290. Sensor 292 may also comprise a plurality of sensors configured at the above-mentioned positions. Sensor 292 can further comprise composition sensors such as hydrocarbon, NOx, or carbon monoxide sensors. Depending on the signals from sensor 292, the controller 212 can execute various instructions to raise, lower, or maintain the exhaust-gas temperature. For example, during a first condition comprising the exhaust-gas temperature being below a first threshold temperature, $T_{TH1}$, the controller 212 can deliver power from the energy storage device 150 to the grid heater 296 in order to raise the exhaust-gas temperature. In another example, during a second condition comprising the exhaust temperature being greater than a first threshold temperature, controller 212 may post inject fuel into the exhaust manifold 248 by delivering fuel via fuel injector 261. During a third condition, comprising the exhaust-gas temperature being greater than a second threshold temperature, the second threshold temperature being greater than the first threshold temperature, the controller 212 can maintain the temperature of the exhaust-gas flowing through the exhaust-gas aftertreatment device by outputting power to the grid heater, post-injecting fuel via the fuel post-injection line, recycling the exhaust-gas via the one or more exhaust-gas recycle lines, and cooling the recycled exhaust-gas by diverting the recycled exhaust-gas through the exhaust-gas recycle cooler.

Controller 212 is shown in FIG. 2 as a conventional microcomputer including microprocessor unit 202, input/output ports 204, read-only memory 206, random access memory 208, keep alive memory 210, and a conventional data bus. Controller 212 is shown receiving various signals from sensors coupled to engine 110, in addition to those signals previously discussed, including: engine coolant temperature (ECT) from temperature sensor 212 coupled to cooling sleeve 214; a position sensor 194 coupled to an accelerator pedal 192 for sensing accelerator position adjusted by vehicle operator 102; a measurement of engine manifold pressure (MAP) from pressure sensor 216 coupled to intake manifold 244; boost pressure from pressure sensor 217 exhaust-gas oxygen concentration from oxygen sensor 286; an engine position sensor from a Hall effect sensor 218 sensing crankshaft 240 position; a measurement of air mass entering the engine from sensor 220 (e.g., a hot wire air flow meter); and a measurement of throttle position from sensor 258. Barometric pressure may also be sensed (sensor not shown) for processing by controller 211. In a preferred aspect of the present description, engine position sensor 218 produces a predetermined number of equally spaced pulses every revolution of the crankshaft from which engine speed (RPM) can be determined.

During operation, each cylinder within engine 110 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

In this manner, as an example, a vehicle may comprise an internal combustion engine, including an exhaust-gas aftertreatment device, an energy storage device coupled to a motor, a fuel post-injection line for post-injecting fuel into the exhaust-gas upstream of the exhaust-gas aftertreatment device, a grid heater located upstream from the exhaust-gas aftertreatment device powered by the energy storage device and configured to heat an exhaust-gas flowing through the exhaust-gas aftertreatment device, one or more exhaust-gas recycle lines and one or more exhaust-gas recycle stream valves for recycling exhaust-gas to an intake of the internal combustion engine, an exhaust-gas recycle cooler attached to the one or more exhaust-gas recycle lines, and a controller. Furthermore, the controller may execute instructions to output power from an energy storage device to the grid heater to raise a temperature of an exhaust-gas flowing through the exhaust-gas aftertreatment device during a first condition, post-inject fuel via the fuel post-injection line to raise the temperature of the exhaust-gas flowing through the exhaust-gas aftertreatment device during a second condition, and maintain the temperature of the exhaust-gas flowing through the exhaust-gas aftertreatment device by outputting power to the grid heater, post-injecting fuel via the fuel post-injection line, recycling the exhaust-gas via the one or more exhaust-gas recycle lines, and cooling the recycled exhaust-gas by diverting the recycled exhaust-gas through the exhaust-gas recycle cooler during a third condition.

The first condition may comprise the exhaust-gas temperature being less than a first threshold temperature, the second condition may comprise the exhaust-gas temperature being greater than a first threshold temperature, and the third condition may comprise the exhaust-gas temperature being greater than a second threshold temperature, the second threshold temperature being greater than the first threshold temperature. The exhaust-gas aftertreatment device may comprise one or more of an oxidation catalyst, a selective reduction catalyst, a lean-NOx trap, and a diesel particulate filter.

The energy storage device of said vehicle may be coupled to a motor, wherein the motor converts kinetic energy to electrical energy for storage at the energy storage device, and the energy storage device may comprise, for example, a battery or a fuel cell. The one or more exhaust-gas recycle lines can include a high-pressure exhaust-gas recycle stream and a high-pressure exhaust-gas recycle valve upstream from the grid heater, and a mid-pressure exhaust-gas recycle stream and a mid-pressure exhaust-gas recycle valve downstream from the grid heater.

Referring now to FIG. 3A, it illustrates light-off curves showing the performance of, for example, a noble metal DOC as a function of exhaust-gas temperature. Curve 310 shows plotted data for carbon monoxide (CO) conversion, while curve 320 shows plotted data for hydrocarbon (HC) conversion, in % conversion versus temperature in ° C. The example DOC shows no activity at low temperatures (e.g., below approximately 120° C.). As the catalyst temperature increases, the oxidation or conversion rates of CO and HC increase. As the catalyst temperature is raised above 150° C., the conversion rates increase steeply with increasing temperature to maximum conversions rates near 90% for CO and 70% for HC. At high temperatures, the catalyst performance stabilizes to form a characteristic plateau on the light-off curve. The CO curve 310 plateaus near 90% near 250° C., while the HC curve plateaus near 70% at 350° C. As such, it may be desirable, for minimizing vehicle emissions, to maintain exhaust-gas temperatures above the plateau temperature. For example, in the case of the example DOC used in FIG. 3A, it may be desirable for minimizing vehicle emissions, to maintain catalyst temperatures above 250° C. (for maximizing CO conversion) or 350° C. (for maximizing CO and HC conversion). Base metal DOC's generally exhibit lower activity than that shown in FIG. 3A. For most catalyst systems, including $Pt/Al_2O_3$, the conversion of CO is higher than that of HC at any given temperature as shown in FIG. 3A. As such, after the cold start of an internal combustion engine, small percentages of exhaust-gas pollutants such as CO and HC can be converted in the DOC, for example, before the engine warms and before the DOC has been adequately warmed.

Referring now to FIG. 3B, it illustrates examples of NOx conversion curves as a function of catalyst temperature for exhaust-gas composition of HC/NOx ~6-12 for two example lean NOx trap (LNT) catalyst types. The exhaust-gas composition comprising an HC/NOx ratio of approximately 6~12 is typical for lean exhaust-gas conditions of high oxygen concentration (e.g., 5-10%), as for the case of diesel exhaust. Curve 330 shows plotted data for a $Pt/Al_2O_3$ catalyst, while curve 340 shows plotted data for a Cu/ZSM-5 catalyst. Conversion efficiencies for both types of catalysts is close to zero at low temperatures, and begin to increase above 150° C. (curve 330) or 200° C. (curve 340). Both catalysts are shown to exhibit a maximum (e.g., peak) NOx conversion at a particular exhaust-gas temperature.

The platinum catalyst reaches a maximum conversion of approximately 50% near 230° C., while the Cu/ZSM-5 catalyst reaches a maximum conversion of approximately 60% near 360° C. The Cu/ZSM-5 catalyst is active at higher temperatures, between approximately 350-500° C., while the platinum catalysts are active at lower temperatures, approximately 110-300° C. The maximum NOx conversion for either type of NOx reduction catalyst is typically 50-60% as illustrated in FIG. 3B. As such, it can be desirable, for minimizing vehicle emissions, to maintain temperatures within a range of temperatures near the peak conversion of the catalyst used in the exhaust-gas aftertreatment device 290. For example, it can be desirable, for minimizing vehicle emissions, to maintain temperatures within a range of 350-450° C. or narrower for the Cu/ZSM-5 catalyst and within a range of 110-300° C. or narrower for the platinum catalyst. Thus if an LNT is used in combination with a DOC as part of an exhaust-gas aftertreatment device, temperature control of the exhaust-aftertreatment device within a specific temperature range can provide for efficient conversion of exhaust-gas components.

Referring now to FIG. 4, it illustrates a process schematic 400 of an engine 110, including an intake air, exhaust, and exhaust-gas recycle flow streams. Process schematic 400 comprises engine 110, turbine 224 coupled via a drive shaft to intake air compressor 222, temperature sensor 292, grid heater 296, exhaust-gas aftertreatment device 290, HP exhaust-gas recycle valve 272, MP exhaust-gas recycle valve 274, exhaust-gas recycle cooler valve 276, and exhaust-gas recycle cooler 278. Air intake compressor 222 serves to supply a greater combustion mass to the engine 110, which can enable engine 110 to output higher drive power. Turbine 224 and compressor 222 thus form a turbocharger. Turbine 224 may be formed with a fixed geometry, which is simpler in design, inexpensive, and thus advantageous relative to conventional turbochargers, which employ variable geometry turbines such as variable nozzle turbines (VNT).

An intake air filter 450 may be located upstream of air intake compressor 222 in order to remove particulate matter and other contaminants. Intake air flow stream may further comprise an intake air cooler 490 and an intake air valve 480. Controller 212 may output signals to intake air cooler 490 and/or intake air valve 480 to cool the intake air temperature and/or to control the flow of intake air to the engine 110.

Accordingly, an exhaust-gas recirculation device for an internal combustion engine may comprise a turbine and an exhaust aftertreament device. The turbine inlet may be connected to an exhaust manifold, wherein the turbine converts kinetic energy contained in an exhaust-gas flow into rotational energy. An inlet of the exhaust-gas aftertreatment device may be connected to an outlet of the turbine. The exhaust-gas aftertreatment device can comprise an electric grid heater arranged between the outlet of the turbine and the inlet of the exhaust-gas aftertreatment device to heat the exhaust-gas flow and to reduce a pollutant content in the exhaust-gas flow. The electric grid heater can have a fixed geometry and can output a heating power of less than 1100 watts, preferably less than 1000 watts. The exhaust-gas recirculation device can further comprise a medium pressure exhaust-gas recirculation loop, wherein the medium pressure exhaust-gas recirculation loop has an inlet connected to an outlet of the electric grid heater, and is arranged upstream of the exhaust-gas aftertreatment device, and a temperature sensor, wherein the temperature sensor is arranged downstream of the turbine, and measures a temperature of the exhaust-gas flow.

A method for controlling an exhaust-gas recirculation device can comprise detecting a start of an internal combustion engine, outputting heating power from an electric grid heater to an exhaust-gas flow of the internal combustion engine during a first time period, and ending the output of heating power to the exhaust-gas flow. The method may further include waiting for a waiting time period to elapse after the detection of the start of the internal combustion engine before outputting heating power from the electric grid heater, and checking the state of an electrical supply source. The waiting time period may be ended in accordance with the state of the electrical supply source. The heating power output from the electric grid heater to the exhaust-gas flow during the first time period may be less than 1100 watts, preferably less than 1000 watts.

A drive for a motor vehicle can comprise an exhaust-gas recirculation device and an internal combustion engine connected to the exhaust-gas recirculation device. The exhaust-gas recirculation device may include a turbine and an exhaust-gas aftertreatment device. The turbine may have an inlet connected to an exhaust manifold and the turbine may be designed to convert kinetic energy contained in an exhaust-gas flow through the exhaust manifold into rotational energy. The exhaust-gas aftertreatment device may have an inlet connected to an outlet of the turbine, and may comprise an electric grid heater arranged between the outlet of the turbine and the inlet of the exhaust-gas aftertreatment device. The electric grid heater may be configured to heat the exhaust-gas flow, and the exhaust-gas aftertreatment device may thus be configured to reduce a pollutant content in the exhaust-gas flow. The drive may further include a control unit, comprising executable instructions to detect a start of an internal combustion engine, check the state of an electrical supply source, wait a duration of a waiting time period, wherein the duration of the waiting time period is ended in accordance with the state of the electrical supply source, output heating power of less than 1100 watts, preferably less than 1000 watts, from an electric grid heater to an exhaust-gas flow of the internal combustion engine during a first time period, the first time period following the waiting time period, and end the output of heating power to the exhaust-gas flow.

As such, a motor vehicle, including a drive, may comprise an internal combustion engine connected to an exhaust-gas recirculation device. The motor vehicle can further comprise a control unit, the control unit comprising executable instructions to detect a start of an internal combustion engine, check a state of an electrical supply source, wait a duration of a waiting time period, wherein the duration of the waiting time period is ended in accordance with the state of the electrical supply source, output heating power of less than 1100 watts, preferably less than 1000 watts, from an electric grid heater to an exhaust-gas flow of the internal combustion engine during a first time period, the first time period following the waiting time period, and end the output of heating power to the exhaust-gas flow. The exhaust-gas recirculation device may comprise a turbine, wherein the turbine has an inlet connected to an exhaust manifold and wherein the turbine is designed to convert kinetic energy contained in an exhaust-gas flow through the exhaust manifold into rotational energy, and an exhaust-gas aftertreatment device having an inlet connected to an outlet of the turbine, the exhaust-gas aftertreatment device configured to reduce a pollutant content in the exhaust-gas flow, the exhaust-gas aftertreatment device further comprising an electric grid heater arranged between the outlet of the turbine and the inlet of the exhaust-gas aftertreatment device and configured to heat the exhaust-gas flow. The motor vehicle may further comprise a battery connected to the electric grid heater of the exhaust-gas recirculation device, and a brake force recuperation device which is connected to the battery, the brake force recuperation device configured to convert kinetic energy of the motor vehicle into electrical energy and to output said electrical energy to the battery.

Turning now to FIG. 5, it illustrates example temperature profiles of an exhaust-gas flow. The exhaust-gas flow data are based on a standardized exemplary vehicle usage situation, the so-called New European Drive Cycle (NEDC). Example conditions for NEDC for a DW10B type engine can comprise an average exhaust mass flow over the first 200 s of approximately 0.016 kg/s, an average exhaust-gas temperature upstream from exhaust-gas aftertreatment devices of 131° C. from 0-200 s following a cold engine start. FIG. 5 shows three example temperature profiles, in degrees Celsius, versus the operating time plotted in seconds, wherein a curve 530 shows an exhaust-gas temperature profile in the absence of a grid heater 296. Curve 530, thus exhibits the lowest temperature values amongst the three data examples. Curves 520 and 510 show respectively modified temperature profiles, wherein heating by 50° C. with an exhaust-gas grid heater of heating power of approximately 800 W (curve 520)k, and by 100° C. with an exhaust-gas grid heater with a heating power of approximately 1600 W (curve 510) have been used as model cases. In the diagram, both in the case of curve 510 and also in the case of curve 520, the grid heater 296 is first activated after a waiting time period 540, or threshold time, of 50 seconds. As shown in FIG. 5, curve 520 illustrates that exhaust-gas temperatures can be raised enough with an 800 W grid heater to quickly reach light-off temperatures of 200-250° C., as compared to the case (curve 530) where no grid heater is used. Curve 510 shows that exhaust-gas temperatures can be raised at a faster rate using a 1500 W grid heater.

A comparison of curves 530 and 520 with FIGS. 3B and 3B shows that, despite the use of a relatively low heating power, the temperature of the exhaust-gas flow can be raised almost immediately into a range in which typical exhaust-gas aftertreatment devices exhibit near maximum conversion efficiency. The example configurations of FIGS. 1-7 therefore make it possible, using an inexpensive and commonly available grid heater upstream of the exhaust-gas aftertreatment device and downstream of the turbine, to obtain considerably reduced pollutant emissions, in particular during the time period immediately following a cold start.

Turning now to FIG. 6, it illustrates a flow chart for a method 600 of controlling an exhaust-gas recirculation device for reducing exhaust emissions from an internal combustion engine. As an example, controller 212 or engine control system 190 may execute instructions to carry out method 600.

Method 600 begins at step 604, where the vehicle operating conditions such as engine operating conditions, torque, vehicle speed, temperatures, times, diesel particulate filter pressure drop, and energy source state-of-charge (SOC), are determined. Then, method 600 continues at step 610, where it is determined if the exhaust-gas temperature is below a set point temperature, $T_{sp}$. The set point temperature, $T_{sp}$, can correspond to a light-off temperature for a DOC, or may be an average or maximum temperature at which near maximum conversion efficiency can be achieved in an exhaust-gas aftertreatment device. For example, $T_{sp}$ may be 300° C. (curve 310) or 400° C. (curve 320) for the DOC catalysts represented in FIG. 3A, or $T_{sp}$ may be 200-250° C. (curve 330) or 350-400° C. (curve 340) for the catalysts represented in FIG. 3B. In other words, $T_{sp}$, can correspond to an exhaust-gas temperature resulting in an exhaust-gas aftertreatment device 290 catalyst temperature that results in the maximum conversion of exhaust-gas pollutants.

If the exhaust-gas temperature is below $T_{sp}$, then method 600 continues at step 620. Otherwise, if the exhaust-gas temperature is not below $T_{sp}$, method 600 continues at step 680. At step 620, method 600 determines if the engine load is stable, or alternately if the time following an engine start has been greater than a threshold time, $t_{TH}$, corresponding to a waiting time period. The waiting time period or threshold time, $t_{TH}$, can be 50 s, as an example, as shown in FIG. 5. The waiting time period may be previously determined according to typical engine operation, specifically corresponding to a time following an engine start after which the engine electrical load has stabilized. If the time elapsed after an engine start is not greater than the waiting time period or $t_{TH}$, then method 600 ends. Otherwise, if the time elapsed is greater than $t_{TH}$, then method 600 continues at step 630.

At step 630, method 600 determines if the exhaust-gas temperature is less than a first threshold temperature $T_{TH1}$. $T_{TH1}$ corresponds to a temperature below which it may be preferable to use grid heater 296 to heat the exhaust-gas in order to reduce exhaust emissions while conserving fuel economy. $T_{TH1}$ may also correspond to a temperature below which it is undesirable to post-inject fuel for heating the exhaust-gas aftertreatment device 290 because at that temperature, fuel combustion will give rise to significant soot or particulate matter deposits fouling the exhaust-gas aftertreatment device 290. $T_{TH1}$ may further correspond to a temperature above which using the grid heater to heat the exhaust-gas becomes inefficient.

If the exhaust-gas temperature is less than $T_{TH1}$, then method 600 continues at step 650, where it determines if the state-of-charge of energy storage device 150 is greater than a threshold state-of-charge, $SOC_{TH}$. $SOC_{TH}$ can correspond, for example, to a state-of-charge, below which the energy storage device 150 does not have enough power to power grid heater 296 simultaneously with other electrical devices such as the air conditioner, headlights, interior cabin lights, rear window defroster, etc. If the state-of-charge is greater than $SOC_{TH}$, then method 600 turns the grid heater on at step 660 to heat the exhaust-gas by supplying power to the grid heater from the energy storage device 150. At the same time, MP exhaust-gas recycle (EGR) valve 274 may be opened in order to recycle exhaust-gas downstream from the grid heater to the air intake. Because the grid heater 296 is heating the exhaust-gas, water vapor or other components in the exhaust-gas can be prevented from condensing. Therefore, when the grid heater 296 is on, possibly indicating a cold engine start and cold exhaust-gas temperatures relative to warm engine operation, it may be preferable to recycle exhaust-gas after it has been heated by the grid heater 296. As such, when the grid heater 296 is on, HP exhaust-gas recycle valve 272 may be closed when the MP exhaust-gas recycle valve 274 is opened. In other examples, the HP EGR valve 272 may be partially closed and the MP EGR valve may be partially opened.

Returning to step 630, if the exhaust-gas temperature is not less than $T_{TH1}$, then method 600 proceeds to step 664. Likewise, if the SOC is not greater than $SOC_{TH}$, then method 600 continues from step 650 to step 664. At step 664, method 600 post-injects fuel into the exhaust in order to raise the exhaust-gas temperature, and optionally turns on the grid heater 296. When the exhaust-gas temperature is greater than a first threshold temperature $T_{TH1}$, heating the exhaust-gas with grid heater 296 may not be as efficient as compared to when the exhaust-gas temperature is below $T_{TH1}$. Furthermore, the exhaust-gas temperature may be raised more rapidly, if both the grid heater and post-injection of fuel are used in combination to heat the exhaust-gas. Further still, augmenting the post-injection of fuel with use of the grid heater 296 may conserve fuel economy because a smaller amount of fuel can be post-injected when the grid heater 296 is used to raise the exhaust-gas temperature by a certain amount relative to if the grid heater 296 is not used. For the case where the SOC is below $SOC_{TH}$, the grid heater 296 may not be used, and post-injection of fuel may be used to heat the exhaust-gas. In an alternate example, for cases where the SOC is below $SOC_{TH}$, the grid heater may be used sparingly (e.g., less power is supplied to the grid heater as compared to the case where $SOC>SOC_{TH}$), but in combination with post-injection of fuel in order to conserve fuel economy. As in step 660, MP exhaust-gas recycle (EGR) valve 274 may be opened in order to recycle exhaust-gas downstream from the grid heater to the air intake. Because the exhaust-gas downstream of turbine 224 is heated by post-injection of fuel and/or the grid heater 296, water vapor or other components in the exhaust-gas can be prevented from condensing, even after decompression through turbine 224. Therefore, when post-injection of fuel is executed, and/or when the grid heater 296 is on, it may be preferable to recycle exhaust-gas after it has been heated by the grid heater 296. As such, when step 664 is executed, HP exhaust-gas recycle valve 272 may be closed when the MP exhaust-gas recycle valve 274 is opened. In other examples, the HP EGR valve 272 may be partially closed and the MP EGR valve may be partially opened.

Next, method 600 continues at step 670, where method 600 determines if the exhaust-gas temperature has reached $T_{sp}$. As stated above, the set point temperature, $T_{sp}$, can correspond to a light-off temperature for a DOC, or may be an average or maximum temperature at which near maximum conversion efficiency can be achieved in an exhaust-gas aftertreatment device such as device 290. If the exhaust-gas temperature has reached $T_{sp}$, then EGR cooler valve 276 may be opened during step 680, or partially opened, to direct a portion of the exhaust-gas through cooler 278, to lower the temperature of the exhaust-gas recycled to the engine intake. Cooling the EGR can help to reduce NOx generated during combustion in the engine 110 by diluting the combustion gas composition, absorbing heat of combustion and lowering the combustion temperatures in the engine. At step 670, if the exhaust-gas temperature has not reached $T_{sp}$, method 600 ends.

Method 600 then continues at step 690 where the exhaust-gas temperature and exhaust emissions are controlled or maintained at or around $T_{sp}$, for example, by manipulating the EGR cooler 278, EGR cooler valve 276, grid heater 296, intake air cooler 490, EGR HP and MP valves 272 and 274, and post-injection rates. For example, by directing a larger EGR flow to air intake by opening EGR valves 272 and/or 274, the engine combustion temperatures can be reduced, thereby reducing NOx production during combustion and reducing exhaust-gas temperatures. Conversely by supplying power to grid heater 296 or by post-injecting fuel into the exhaust, the exhaust-gas temperature can be raised. By maintaining exhaust-gas temperatures near $T_{sp}$, the exhaust-gas aftertreatment device 290 can operate near maximum conversion efficiencies, thereby minimizing emissions of NOx, and other pollutants such as CO and HC.

Turning now to FIG. 7, it illustrates a flow chart for a method 700 of controlling an exhaust-gas recirculation device for regenerating a diesel particulate filter (DPF) and for reducing exhaust emissions from an internal combustion engine, while conserving fuel economy. As an example, controller 212 or engine control system 190 may execute instructions to carry out method 700. In some examples, method 700 can operate simultaneously or in conjunction with method 600. In other examples, method 600 and method 700 may be executed independently from one another. For example, when performing a DPF regeneration, the exhaust-gas may be rapidly heated to regenerate the DPF and maintaining the exhaust-gas temperature at $T_{sp}$ in method 600 may be temporarily discontinued.

Method 700 begins at step 710, where the vehicle operating conditions such as engine operating conditions, torque, vehicle speed, temperatures, times, diesel particulate filter pressure drop, and energy source state-of-charge (SOC), are determined. Then, method 700 continues at step 720, where it is determined if the engine load is stable, or alternately, if the time following an engine start has been greater than a threshold time, $t_{TH}$, corresponding to a waiting time period. The waiting time period or threshold time, $t_{TH}$, can be 50 s, as an example, as shown in FIG. 5. The waiting time period may be previously determined according to typical engine operation, specifically corresponding to a time following an engine start after which the engine electrical load has stabilized. If the time elapsed after an engine start is not greater than the waiting time period or $t_{TH}$, then method 700 ends. Otherwise, if the time elapsed is greater than $t_{TH}$, then method 700 continues at step 730.

At step 730, method 700 determines if the pressure drop ($\Delta P$) across a diesel particulate filter (DPF), which for example can be a component of exhaust-gas aftertreatment device 290, is greater than a threshold pressure drop $\Delta P_{TH}$. $\Delta P_{TH}$ can correspond to a pressure drop above which the DPF is plugged sufficiently with soot or particulate matter such that it no longer operates effectively to trap additional particulate matter in the exhaust, may inhibit exhaust-gas flow, and may allow particulate matter to be emitted from the exhaust into the atmosphere. $\Delta P_{TH}$ may also be a threshold pressure drop indicating that the DPF may be regenerated promptly to avoid the adverse effects just described.

If $\Delta P$ is less than $\Delta P_{TH}$, then regeneration of the DPF is not needed and method 700 continues at step 736 wherein the grid heater 296 may be switched off, post-injection of fuel may be stopped and the HP and MP EGR valves 272 and 274 may be opened or partially opened. Otherwise, if the DPF pressure drop is greater than $\Delta P_{TH}$, then method 700 continues at step 740, where it determines if the state-of-charge of energy storage device 150 is greater than a threshold state-of-charge, $SOC_{TH}$. As previously described, $SOC_{TH}$ can correspond, for example, to a state-of-charge, below which the energy storage device 150 does not have enough power to power grid heater 296 simultaneously with other electrical devices such as the air conditioner, headlights, interior cabin lights, rear window defroster, etc. If the state-of-charge is greater than $SOC_{TH}$, then method 700 turns the grid heater on at step 750 to heat the exhaust-gas by supplying power to the grid heater from the energy storage device 150. At the same time, HP and MP exhaust-gas recycle (EGR) valves 272 and 274 may be closed in order to direct all heated exhaust-gas downstream from the grid heater to the DPF at the exhaust-gas aftertreatment device 290. By directing all heated exhaust-gas to the DPF, the DPF can be heated more rapidly, as compared to when a portion of the exhaust-gas is recycled to engine air intake. Alternately, HP EGR valve may be opened or partially opened and MP EGR valve may be closed. In this manner, EGR can still be used to mitigate NOx generation in the combustion chamber, and all heated exhaust-gas downstream of grid heater 296 can still be directed through DPF at exhaust-gas aftertreatment device 290. Further alternately, MP and HP EGR valves may be partially opened to allow a small amount of exhaust-gas to be recycled.

Returning to step 740, if the SOC is not greater than $SOC_{TH}$, then method 700 continues from step 740 to step 754. At step 754, method 700 switches off the grid heater 296 since energy storage device 150 does not have enough energy to supply power to grid heater 296 simultaneously with powering other electrical devices such as the cabin lighting, headlights, air-conditioning, etc.

Next, method 700 continues at step 760, where fuel is post-injected into the exhaust in order to raise the exhaust-gas temperature. During DPF regeneration, exhaust-gas temperatures can be heated to 600° C. As such the grid heater 296 alone, configured for heating the exhaust-gas, may not have sufficient power to raise the DPF temperature to 600° C. As such, post-injection of fuel can be used primarily to raise the DPF temperature for effective DPF regeneration. However, the grid heater 296 can be used to supplement and/or initiate the DPF heating so that overall fuel economy can be conserved. In this manner, a smaller quantity of fuel is needed for post-injection during DPF regeneration as compared to when a grid heater 296 is not used. During the post-injection, MP EGR valve is not opened, so as to direct all heated exhaust-gas to flow through the DPF. Controller 212 may control the injection rate of post-injected fuel so as to raise the exhaust-gas temperature at a predetermined rate.

Next, method 700 continues at step 770, where method 700 determines if the exhaust-gas temperature has reached the DPF regeneration temperature. The DPF regeneration temperature, can correspond to a temperature of 600° C., or another temperature at which particulate matter or soot byproducts from the combustion of fuel can be efficiently reacted and volatilized, thereby regenerating the DPF. If the exhaust-gas temperature has not reached the DPF regeneration temperature, then method 700 ends.

If the exhaust-gas temperature has reached the DPF regeneration temperature, method 700 then continues at step 780 where the grid heater 296 may be switched off, and the MP EGR valve may be opened or partially open. Recycling exhaust-gas through the MP EGR valve may be desirable for preventing condensation of exhaust-gas components and for reducing NOx generation in the engine combustion chamber. Next, method 700 proceeds to step 790, where the exhaust-gas temperature and exhaust emissions are controlled or maintained at or around the DPF regeneration temperature, for example, by manipulating the EGR cooler 278, EGR cooler valve 276, grid heater 296, intake air cooler 490, EGR HP and MP valves 272 and 274, and fuel post-injection rates. For example, by directing a larger EGR flow to air intake by opening EGR valves 272 and/or 274, the engine combustion temperatures can be reduced, thereby reducing NOx production during combustion and reducing exhaust-gas temperatures. Conversely by supplying power to grid heater 296 or by post-injecting fuel into the exhaust, the exhaust-gas temperature can be raised. By maintaining exhaust-gas temperatures near the DPF regeneration temperature, the DPF at exhaust-gas aftertreatment device 290 can be rapidly regenerated.

Once the pressure drop across the DPF drops below $\Delta P_{TH}$ (e.g., at step 730), method 700 continues to step 736 and switches off the grid heater, stops the post-injection of fuel, and opens or partially opens one or both of the HP and MP EGR valves. After step 736, the DPF regeneration is completed, and method 700 ends.

In this manner, methods 600 and 700 for engine emissions reduction, executable by a controller or an engine control system, can comprise powering a grid heater using an energy storage device to raise an exhaust-gas temperature during a first condition, injecting fuel to raise the exhaust-gas temperature during a second condition, and maintaining the exhaust-gas temperature by outputting power to the grid heater, injecting fuel, recycling the exhaust-gas, and cooling the recycled exhaust-gas with an EGR cooler during a third condition. Furthermore, the first condition may comprise the exhaust-gas temperature being less than a first threshold temperature, the second condition may comprise the exhaust-gas temperature being greater than a first threshold temperature, and the third condition may comprise the exhaust-gas temperature being greater than a second threshold temperature. Further still, the second threshold temperature may be greater than the first threshold temperature, and the exhaust-gas temperature may comprise an exhaust-gas temperature upstream from the exhaust-gas aftertreatment device.

The first condition can further comprise a state-of-charge of an energy storage device being greater than a threshold state-of-charge, $SOC_{TH}$, and the second condition may further comprise the state-of-charge of the energy storage device being less than a threshold state-of-charge, $SOC_{TH}$. The first condition can further comprise after a threshold time, $t_{TH}$, has elapsed following detection of an engine start, and the exhaust-gas temperature is below the second threshold exhaust-gas temperature, $T_{TH2}$. The second threshold exhaust-gas temperature may correspond to a set point temperature $T_{sp}$ or a DPF regeneration temperature. The methods can further comprise, during a third condition, cooling an engine intake airflow with an intake air cooler. Furthermore, the first, second and third conditions may be mutually exclusive.

Further still, the energy storage device in methods 600 and 700 can further comprise an energy storage device coupled to a generator, wherein the generator converts kinetic energy to electrical energy for storage at the energy storage device, such as in regenerative braking.

The first condition may comprise a pressure drop across a diesel particulate filter (DPF) being greater than a threshold pressure drop and a state-of-charge of an energy storage device being greater than a threshold state-of-charge. The second condition may comprise the pressure drop across the diesel particulate filter being greater than the threshold pressure drop and a state-of-charge of an energy storage device being less than a threshold state-of-charge. The third condition may comprise the exhaust-gas temperature being greater than a DPF regeneration temperature. Furthermore, the first, second and third conditions may be mutually exclusive.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust-gas recirculation device for an internal combustion engine, the exhaust-gas recirculation device comprising:
   a turbine, wherein a turbine inlet is connected to an exhaust manifold and wherein the turbine is configured to convert kinetic energy contained in an exhaust-gas flow through the exhaust manifold into rotational energy;
   an exhaust-gas aftertreatment device, wherein an exhaust-gas aftertreatment device inlet is connected to an outlet of the turbine, the exhaust-gas aftertreatment device configured to reduce a pollutant content in the exhaust-gas flow, the exhaust-gas aftertreatment device comprising an electric grid heater arranged between the outlet of the turbine and the exhaust-gas aftertreatment device inlet and configured to heat the exhaust-gas flow;
   a medium pressure exhaust-gas recirculation loop, wherein the medium pressure exhaust-gas recirculation loop has an inlet connected to an outlet of the electric grid heater, and is arranged upstream of the exhaust-gas aftertreatment device; and
   a temperature sensor, wherein the temperature sensor is arranged downstream of the electric grid heater and upstream of the exhaust-gas aftertreatment device and measures a temperature of the exhaust-gas flow.

2. The exhaust-gas recirculation device of claim 1, wherein the electric grid heater outputs a heating power of less than 1100 watts, preferably less than 1000 watts, and wherein the turbine has a fixed geometry.

3. The exhaust-gas recirculation device of claim 2, further comprising:
   a high pressure exhaust-gas recirculation loop including an inlet upstream of the turbine, an outlet upstream of a compressor, a high pressure valve, an EGR cooler, and an EGR cooler valve, wherein the high pressure exhaust-gas recirculation loop is in fluid communication with the medium pressure exhaust-gas recirculation loop.

4. A drive for a motor vehicle, the drive comprising an exhaust-gas recirculation device and an internal combustion engine connected to the exhaust-gas recirculation device, the exhaust-gas recirculation device comprising:
   a turbine, wherein the turbine has an inlet connected to an exhaust manifold and wherein the turbine is designed to convert kinetic energy contained in an exhaust-gas flow through the exhaust manifold into rotational energy;
   an exhaust-gas aftertreatment device having an inlet connected to an outlet of the turbine, the exhaust-gas aftertreatment device configured to reduce a pollutant content in the exhaust-gas flow, the exhaust-gas aftertreatment device further comprising an electric grid heater arranged between the outlet of the turbine and the inlet of the exhaust-gas aftertreatment device and configured to heat the exhaust-gas flow;
   a medium pressure EGR loop including an inlet downstream of the electric grid heater and upstream of the exhaust-gas aftertreatment device, an outlet upstream of a compressor, and a medium pressure EGR valve;
   a high pressure EGR loop including an inlet upstream of the turbine, an outlet upstream of the compressor, a high pressure EGR valve, an EGR cooler, and an EGR cooler valve;
   a bypass line fluidically coupling the high pressure EGR loop with the medium pressure EGR loop, having an inlet downstream of the high pressure EGR valve and upstream of the EGR cooler and EGR cooler valve, and an outlet downstream of the medium pressure EGR valve and upstream of the compressor; and
   a temperature sensor arranged downstream of the electric grid heater and upstream of the exhaust-gas aftertreatment device and which measures a temperature of the exhaust-gas flow.

5. The drive of claim 4, having a control unit, the control unit comprising executable instructions to:
   detect a start of the internal combustion engine;
   check a state of an electrical supply source, and wait a duration of a waiting time period, wherein the duration of the waiting time period is ended in accordance with the state of the electrical supply source;
   output heating power of less than 1100 watts, preferably less than 1000 watts, from the electric grid heater to the exhaust-gas flow of the internal combustion engine during a first time period, the first time period following the waiting time period; and
   end the output of heating power to the exhaust-gas flow.

6. A method for engine emissions reduction, comprising:
   during a first condition, powering a grid heater using an energy storage device to raise an exhaust-gas temperature;
   during a second condition, injecting fuel to raise the exhaust-gas temperature; and
   during a third condition, maintaining the exhaust-gas temperature by outputting power to the grid heater, injecting fuel, recycling the exhaust-gas, and cooling recycled exhaust-gas with an exhaust-gas recycle cooler coupled upstream of a charge-air cooler, wherein recycling the exhaust-gas comprises diverting a portion of the exhaust-gas to one or more exhaust-gas recycle lines, wherein the one or more exhaust-gas recycle lines comprise a high-pressure exhaust-gas recycle stream directed through the exhaust-gas recycle cooler and a high-pressure exhaust-gas recycle valve upstream from the grid heater, and a mid-pressure exhaust-gas recycle stream and a mid-pressure exhaust-gas recycle valve downstream from the grid heater.

7. The method of claim 6, wherein:
   the first condition comprises the exhaust-gas temperature being less than a first threshold temperature;
   the second condition comprises the exhaust-gas temperature being greater than the first threshold temperature;
   the third condition comprises the exhaust-gas temperature being greater than a second threshold temperature, the second threshold temperature being greater than the first threshold temperature; and
   wherein the exhaust-gas temperature comprises an exhaust-gas temperature upstream from the exhaust-gas aftertreatment device and downstream from the grid heater.

8. The method of claim 7, wherein the first condition further comprises a state-of-charge of an electrical energy storage device being greater than a threshold state-of-charge, and wherein the second condition further comprises the state-of-charge of the electrical energy storage device being less than the threshold state-of-charge.

9. The method of claim 8, wherein the first condition further comprises after a threshold time has elapsed following detection of an engine start and the exhaust-gas temperature is below the second threshold exhaust-gas temperature.

10. The method of claim 7, further comprising, during the third condition, cooling an engine intake airflow with an intake air cooler.

11. The method of claim 8, wherein the energy storage device is coupled to a generator and wherein the generator converts kinetic energy to electrical energy for storage at the energy storage device.

12. The method of claim 6, wherein:
the first condition comprises a pressure drop across a diesel particulate filter (DPF) being greater than a threshold pressure drop and a state-of-charge of an energy storage device being greater than a threshold state-of-charge;
the second condition comprises the pressure drop across the diesel particulate filter being greater than the threshold pressure drop and the state-of-charge of the energy storage device being less than the threshold state-of-charge; and
the third condition comprises the exhaust-gas temperature being greater than a DPF regeneration temperature.

13. The method of claim 12, wherein the first condition further comprises after a threshold time has elapsed following detection of an engine start.

\* \* \* \* \*